Aug. 28, 1951  N. DROSHINE  2,566,082
BUTCHER'S TOOL RACK
Filed July 9, 1947  2 Sheets-Sheet 1
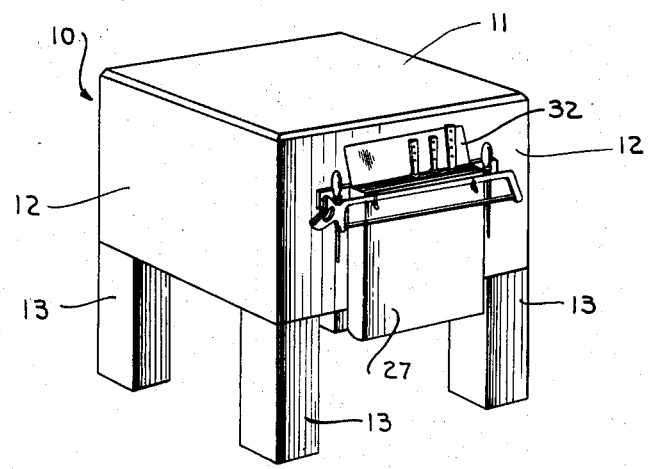
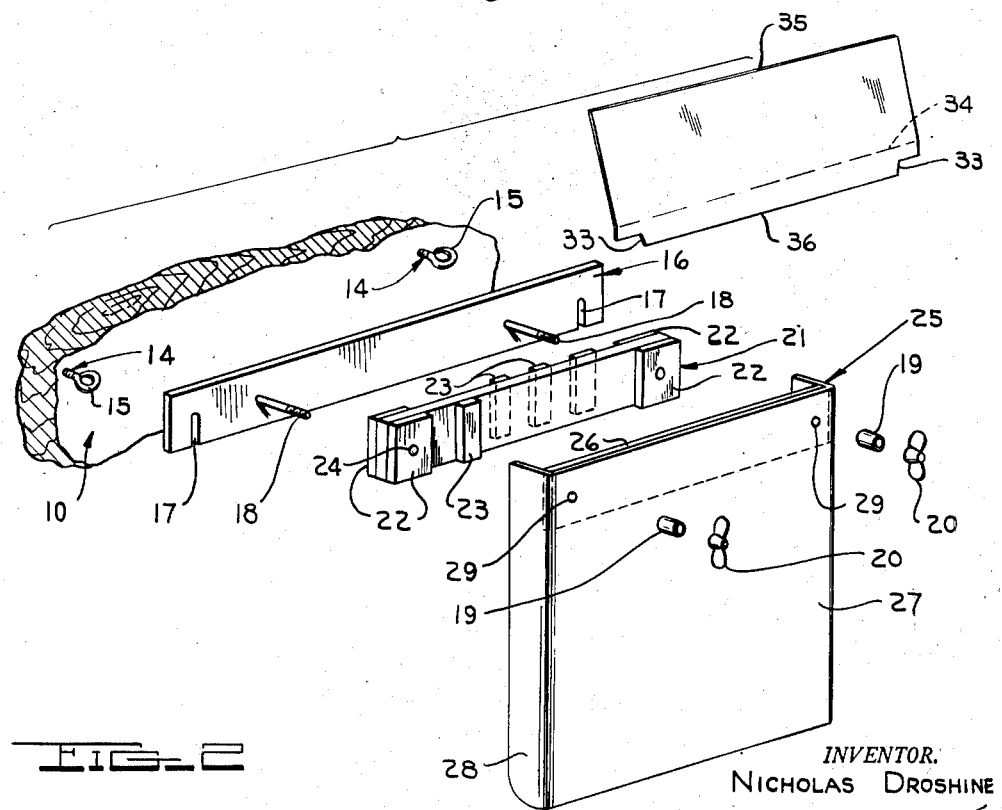
INVENTOR.
NICHOLAS DROSHINE
BY Gregory S. Dolgorukov
ATTORNEY Aug. 28, 1951   N. DROSHINE   2,566,082
BUTCHER'S TOOL RACK
Filed July 9, 1947   2 Sheets-Sheet 2
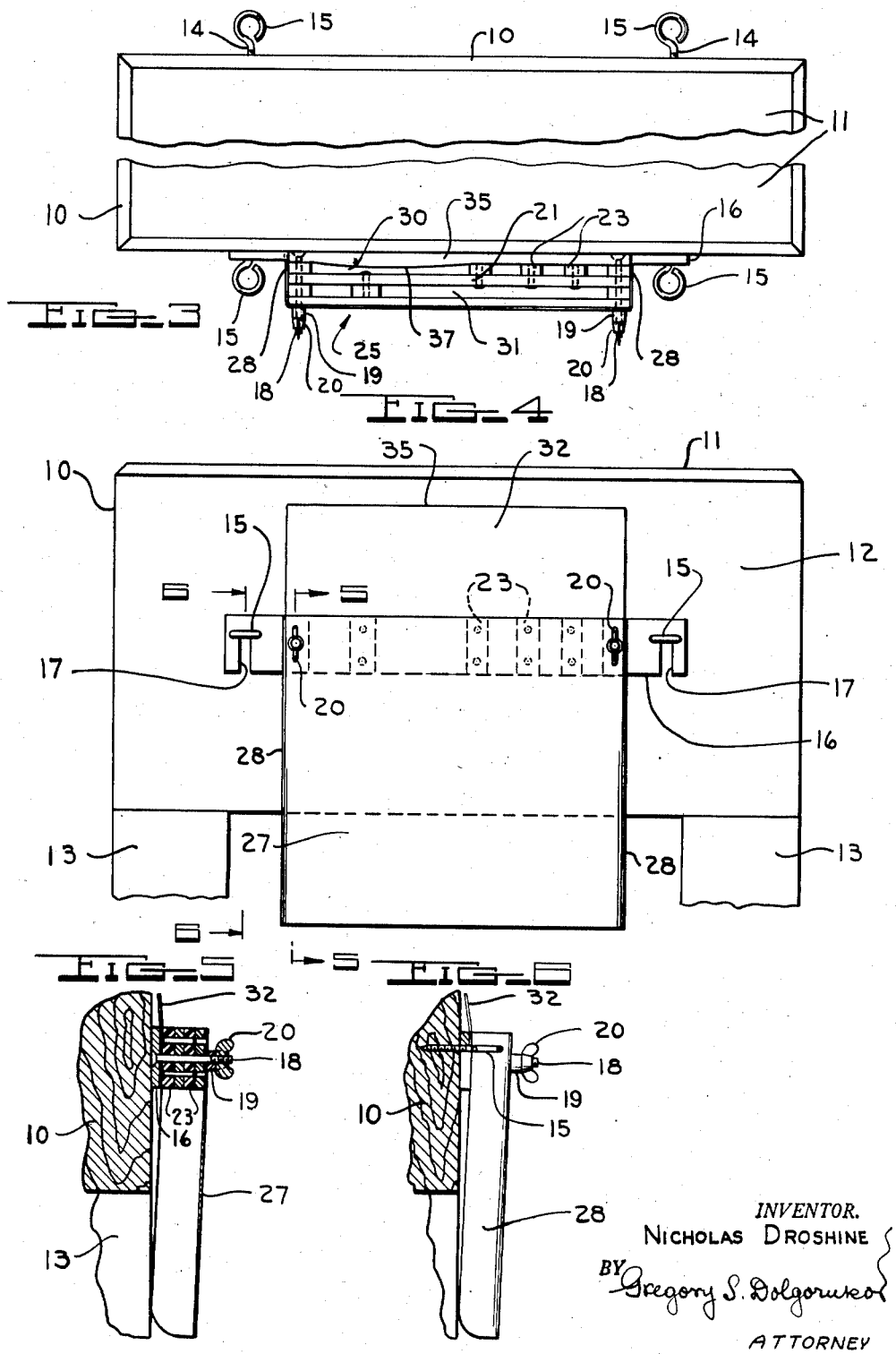
INVENTOR.
NICHOLAS DROSHINE
BY Gregory S. Dolgoruko
ATTORNEY Patented Aug. 28, 1951

2,566,082

UNITED STATES PATENT OFFICE 2,566,082

BUTCHER'S TOOL RACK

Nicholas Droshine, Royal Oak, Mich.

Application July 9, 1947, Serial No. 759,872

3 Claims. (Cl. 211—60)

This invention relates to butchers' or meat blocks and to an improved tool rack therefor.

Butchers' blocks are used in butchers' shops, meat stores, and in the meat trade in general for cutting the meat into smaller portions or pieces, or as it is referred to in the trade into wholesale or retail cuts, or both, depending upon the character of the trade in which a particular shop is engaged. Such cutting operations require a considerable number of tools in order that cutting be accomplished efficiently and neatly. While complicated machines may be used for greater efficiency, for hand cutting the usual set of tools includes an ax or cleaver; a handsaw; several knives, the number of which should be sufficient to avoid frequent sharpening; and, one or two round files for sharpening the knives. These tools must be kept constantly at hand, not be thrown around on counters or shelves and become misplaced, or fall down causing injury to personnel, or create danger of cutting hands, which besides direct injury may be a source of serious or even fatal infection. Meat blocks are usually made of wood. When round blocks of the stump type were substituted by rectangular blocks having flat sides, there came into use racks in the form of wooden boards nailed to the block, spacer pieces of wood being provided between the block and the board to form a slot or hole into which knives are inserted when not in actual use.

While performing their intended functions, the meat blocks with such tool racks proved to have a number of serious disadvantages. In use, block surfaces become impregnated with meat juices, while small particles of meat and bones accumulate in the corners and other less accessible places. Although the open surfaces of the block may be easily washed and scraped after each day's use, the attached tool racks have to be separated from the block, which requires the use of tools and may be difficult. Such racks do not come apart, and therefore even after having been taken off the block and thoroughly washed, they still retain meat juices as well as small particles of meat and bones in the corners and cracks. Such juices and particles of meat soon start decomposing producing very offensive smell, provide breeding places of germs and, in general, become most unsanitary. Moreover these racks, when roughened by knives after some use, become a source of painful splinters in operators' hands; also they crack and are easily broken even in normal use. When washed with hot water, these racks warp and do not fit on the block tightly, thus increasing still further the objectionable situation. Furthermore, the portion of the block under the rack becomes pitted with nail holes and, having no chance to dry thoroughly, begins decaying.

For convenience of operation, the tool rack must usually be arranged on the right hand side of the operator in order that the tools could be easily reached with the right hand. Thus, by arranging or fixing the tool rack to a certain side of the block, the side or portion of the top surface of the block to be worked at thus becomes established. With the tool rack permanently fixed to one side of the block, the same limited portion of the top surface of the block has to be constantly used and it is never thoroughly dried. The wet portion of the wood is much softer than the dry and hard portion. In chopping the meat, the cleaver penetrates much deeper into the wet wood than it would into a dry and hard portion of the block, and wears such wet portion of the block surface very rapidly, requiring frequent resurfacing of the block and thus shortening its life.

One of the objects of the present invention is to provide an improved butcher's tool rack whereby the above disadvantages are overcome and largely eliminated.

Another object of the invention is to provide an improved butcher's or meat block tool rack whereby the hand tools used in cutting meat are kept close at hand, do not get lost or misplaced, do not fall off, and yet do not present the danger of cutting hands.

A further object of the invention is to provide an improved butcher's tool rack, means being provided whereby said rack is held firm and tight on the block, does not rattle or shift from side to side, and yet may be taken off the block simply and easily and without the use of any tools.

A still further object of the invention is to provide an improved tool rack for a butcher's block, which can be taken off the block very easily and disassembled into simple components which may be cleaned, washed or even sterilized, and then again put on the block in a similarly simple and easy manner.

A still further object of the invention is to provide an improved tool rack for a butcher's block which is made of strong material, particularly metal, is not likely to be broken in use, and yet in which the knife cutting edges do not come in contact with the metal and therefore do not get dulled and do not roughen the rack.

A still further object of the present invention is to provide an improved tool rack for a butcher's block, having means whereby the points or the blades of cutting tools such as knives are automatically guided into the blade-receiving recess or slot of the rack as the knives are being placed or inserted into the rack, thus ensuring speedy and accurate insertion of the knives and other tools into the rack and preventing dulling or breaking of their points.

A still further object of the invention is to provide an improved tool rack of the foregoing character, in which means are provided to push the handles of the knives already in the rack away from the block and thus to make grasping their handles more easy and convenient.

Other objects of this invention will appear in the following description and appended claims, reference being had to the accompanying drawings forming a part of this specification, wherein like reference characters designate corresponding parts in the several views.

Fig. 1 is a perspective view of a butcher's block embodying the present invention, the tool rack being shown attached to the block and a number of tools being inserted into the rack.

Fig. 2 is an exploded view of the rack illustrated in Fig. 1.

Fig. 3 shows in a top view a portion of the block and the tool rack attached thereto.

Fig. 4 shows in elevation the portion of the block of Fig. 3 and the tool rack attached thereto.

Fig. 5 is a fragmentary sectional view taken in the direction of the arrows on the section plane passing through the line 5—5 of Fig. 4.

Fig. 6 is a fragmentary sectional view taken in the direction of the arrows on the section plane passing through the line 6—6 of Fig. 5.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, the butcher's block illustrated therein comprises a wooden body 10 of rectangular shape and having a meat cutting surface 11 and flat sides 12. The body 10 is supported on legs 13 secured to the body in any suitable manner. The body 10 is preferably made of relatively small wooden sections connected together in a manner well known in the art. The upper surface 11 is maintained flat and as it wears out, it is recut or refinished, which operation is termed "resurfacing of the block."

There are provided on the block, at least at two sides thereof, two eye hooks 14 or similar members adapted to be secured to the body 10. It is preferable to have said members provided with eyes 15, disposed in a horizontal plane as is shown in Figs. 2, 3 and 4, thus adapting said eyes 15 to receive and support such tools as round files for sharpening knives, see Fig. 1.

The tool rack proper comprises a base member 16 made preferably of strip metal such as aluminum. The member 16 is adapted to engage the hooks 14 and to be supported thereby. In the present embodiment of the invention, the member 16 is provided with slots 17 extending upwardly from its lower edge and terminating at a distance from the upper edge of said member 16. Said slots are spaced similarly to eye hooks 14, and therefore the member 16 may be placed on said screws and be supported thereby. As can be best seen in Figs. 2 and 3, the hooks 14 have a portion of their straight body or shank protruding from the block for a distance only slightly larger than the thickness of the member 16, and the slots 17 have their width only slightly larger than the diameter of said portions of the screws. Therefore, the member 16 when placed on said screws is held thereon tightly and without moving from side to side, and yet it can be removed merely by raising it upward for a distance equal to the length of the slots 17.

To the member 16 there are secured or otherwise connected threaded members or studs 18 adapted to receive at their threaded ends spacer sleeves 19 and wing nuts 20. The studs 18 are adapted to engage a spacer member 21 comprising a strip of material, preferably of metal such as aluminum, to which there are riveted or otherwise secured a number of spacer pieces 22 and 23. The spacer pieces are secured to the member 21 on both sides thereof. The pieces 22 are secured to the ends of the member 21, and the pieces 23 intermediate said ends. All of said pieces are made of a material that would not dull the knife blades, non-metallic materials such as fiber or wood being most suitable. Holes 24, 24 are provided in the member 21 in registration with the studs 18.

A cover member 26 approximately coextensive with the member 21 and provided with holes 29 for the passage of the studs 18 can be connected to the spacer member 21 with the aid of the wing nuts 20. To the cover member 26 there is riveted or otherwise secured a safety apron sheet 27 having its vertical edges bent to provide flanges 28 embracing and covering from sides the ends of the spacer member 21, as shown. The flanges 28 should not be wider than the transverse overall dimension of the assembled rack, in order to prevent interference with tightening of the rack in assembly. The depending apron sheet 27 extends downwardly from the cover member 26 for such a distance as to cover the point of the longest knife likely to be inserted into the rack. The apron sheet 27 and the cover member 26 being secured together form an apron member designated herein by a numeral 25. It should be understood however that these members may be separate.

For assembling the rack, the studs 18 are first passed through the holes 24, 24 of the spacer member 21 and holes 29, 29 of the apron 25, whereupon the spacing sleeves 19 and wing nuts 20 are applied to the ends of the studs and tightened. Thereupon the rack is placed on the block with the slots 17 engaging the eye hooks 14.

By virtue of such a construction there is provided a tool rack having two slots 30 and 31, see Fig. 3, for reception of butcher's tools. It is preferable to make spacer pieces of such respective thicknesses that the slot 31 is somewhat wider and thus is better adapted to receive and to hold securely the ax or cleaver (not shown). The slot 30 is relatively narrow, one quarter of an inch being one of suitable width dimensions. The spacer pieces 22 and 23 do not dull the blades. Since the slots, particularly the slot 30 is relatively narrow, the cutting edges of the knife blades contact the metal sides of the slots at a small angle. Therefore, the knives may be inserted into the rack without particular care and yet they do not get dulled.

A number of important advantages of my improved tool rack result from the provision of means operating to facilitate insertion of knives and other tools into the rack by guiding their points or blades. In the present embodiment of the invention said means are exemplified by a guide sheet 32 which in the assembled condition of the rack is held between the base member 16 and the spacer member 21. The lower corners of the guide sheet 32 are notched or cut away to provide shoulders 33, 33 adapted to rest on the studs 18 and thus to locate properly the guide sheet 32. The guide sheet 32 is bent such as along the broken line 34 to bring its upper edge 35 over the member 16, and thus ensuring that in the assembled condition of the rack, the sheet 32 has some spring action causing said edge 35 to press against the block 10. In inserting a knife, its point is simply slid downwardly against the guide sheet 32 and right into the slot without the necessity of finding the slot with the point of the knife, which is not only tedious but can cause dulling or even breaking of the knife point. The lower edge 36 of the guide sheet 32 may be slightly bent away from the block, as is best shown in Fig. 3 at 37, whereby the edge 36 operates to hold the knives and their handles further away from the block, thus ensuring a more convenient grasping of the handles.

It can be easily seen that the guide sheet 32 is tightly held in place by tightening the wing nuts 20. It can be easily removed by hand when the wing nuts 20 are loosened. Also, it can be left in place and removed with the rack when the same is removed as a unit from the eye hooks 15.

When the rack is attached to the block, the wing nuts 20 are set to have their wings in vertical planes as shown in the drawings, and thus to provide, in effect, hooks which hold the handsaw in place. The spacing sleeves 19 ensure sufficient room for the saw frame, and they may be secured to the wing nuts 20 if desired. I prefer to use the wing nuts and sleeves in order to use standard commercially available parts. It will be understood, however, that special T-shaped pieces or the like with a longitudinal topped hole may be used.

It will now be seen in view of the foregoing that my improved tool rack can be removed from the block merely by taking it off the eye hooks, even without removing the tools. It may also be taken off from the block part by part. When the rack is removed, each of its parts may be washed separately and thoroughly, sterilized if desired, and dried. When the rack is disassembled, the spacers become fully accessible and can easily be brushed with a kitchen brush, scraped with a knife, and throughly washed. This feature prevents, even with wooden spacers, the unsanitary results described above and observed in conventional wooden and other racks which are not constructed with a view to being disassembled fully after each use. The entire block may be also thoroughly washed and left to dry before putting the tool rack on again. Thus the meat block and therefore the entire butcher's shop may be maintained in a very clean and sanitary condition, and such maintenance is made very easy. The source of obnoxious smell and the breeding places for germs are effectively eliminated. By the provision of the eye hooks at least on two sides of the block, the user may alternate the tool rack from one side of the block to another, thus giving the block sufficient time to dry. With the eye hooks provided at two opposite sides, the block may be turned 180° each time when the tool rack is moved to the opposite side, in order to have in use the tools at the proper side of the user of the block. Such drying of the block is beneficial for the side of the block as well as for the top surface thereof. The wood on the top surface of the block that had a chance to dry is hard and does not permit the cleaver to penetrate as deep as into the wet wood. Thus wear of the block is not only reduced but also made more even over the entire top surface of the block, thus reducing the necessity of frequent resurfacing of the block and increasing useful life of the block.

It will be understood that as a result of the present disclosure, a number of modifications may easily suggest themselves to those skilled in the art, and that such modifications may be made without departing from the scope of the present invention.

For instance, more than two slots or a single slot may be provided on the rack; the studs holding the rack together, the wing nuts and the sleeves may be substituted by a single T-shaped piece.

I claim:

1. In a butcher's block, at least two members embedded in said block and protruding outwardly therefrom, a tool rack detachably mounted on said block and comprising a base member adapted to engage said embedded members and to be supported thereon, a spacer member detachably connected to said base member and having a number of spacer pieces secured to it at both sides, and an apron, detachably connected to said spacer member and said base member, whereby at least two slots for receiving tools are formed in said rack, and a detachable guide sheet provided along said base member.

2. In a tool rack for a butcher's block having a flat side, said rack having at least one knife-receiving slot extending along the side of the block, guide means provided on said rack and adapted to guide knife blades into said slot, said means comprising a detachable metal sheet provided only on the block side of said knife-receiving slot and extending upwardly therefrom in a substantially vertical plane for a substantial distance, said sheet having an upper edge fitting against the side of the block and a lower edge disposed to form the block side of the knife-receiving slot.

3. In a tool rack for a butcher's block having a flat side, said rack having at least one knife-receiving slot extending along the side of the block, guide means provided on said rack and adapted to guide knife blades into said slot, said means comprising a detachable metal sheet provided only on the block side of said knife-receiving slot and extending upwardly therefrom in a substantially vertical plane for a substantial distance, said sheet having an upper edge fitting against the side of the block and a lower edge disposed to form the block side of the knife-receiving slot, the lower portion of said sheet being adapted to contact the lower ends of the knife handles for holding the upper ends of the knife handles away from the block.

NICHOLAS DROSHINE.

REFERENCES CITED

The following references are of record in the file of this patent:

UNITED STATES PATENTS

| Number | Name | Date |
|---|---|---|
| 695,380 | Duer | Mar. 11, 1902 |
| 1,155,967 | Stoutenburgh | Oct. 5, 1915 |
| 1,323,915 | Schmitt | Dec. 2, 1919 |
| 1,742,102 | Seagles | Dec. 31, 1929 |
| 1,876,284 | Fried | Sept. 6, 1932 |
| 2,122,069 | Michelson | June 28, 1938 |
| 2,183,074 | Hopkins | Dec. 12, 1939 |
| 2,338,303 | Rosenberg | Jan. 4, 1944 |